F. H. FARMER.
WAVE MOTOR.
APPLICATION FILED JUNE 12, 1909.

974,869.

Patented Nov. 8, 1910.

2 SHEETS—SHEET 1.

Witnesses:

Inventor
Frank H. Farmer

F. H. FARMER.
WAVE MOTOR.
APPLICATION FILED JUNE 12, 1909.

974,869.

Patented Nov. 8, 1910.
2 SHEETS—SHEET 2.

Witnesses
H. G. Prost.
M. Regner.

Inventor.
Frank H. Farmer
By E. E. Osborn
his attorney.

UNITED STATES PATENT OFFICE.

FRANK H. FARMER, OF SAN FRANCISCO, CALIFORNIA, ASSIGNOR, BY MESNE ASSIGNMENTS, TO LUTHER SADLER, OF SAN FRANCISCO, CALIFORNIA.

WAVE-MOTOR.

974,869.  Specification of Letters Patent.  Patented Nov. 8, 1910.

Application filed June 12, 1909. Serial No. 501,779.

*To all whom it may concern:*

Be it known that I, FRANK H. FARMER, a citizen of the United States, and a resident of the city and county of San Francisco, State of California, have invented new and useful Improvements in Wave-Motors, of which the following is a specification.

This invention relates to improvements in that type of wave motor in which the movements of a float or buoyant structure riding at anchor are applied to operate machinery or perform useful work.

The object of the invention is to provide an improved wave motor wherein the energy of the waves or the swell moving in any direction will be transformed into rotary motion of a shaft from which power can be taken and applied to operate machinery or transmitting mechanism.

Another object of the invention is to provide novel transforming means of apparatus having the quality of transforming the oscillations or the pitching and rolling movements of a float riding at anchor into motion either reciprocating or rotary or both, regardless of the direction of the waves with relation to the float.

To such ends and objects chiefly the invention comprises certain novel parts and combination of parts producing an improved wave motor wherein all the parts and mechanism are mounted and carried on the float and are not immersed or submerged either wholly or partially in the water, but are out of direct contact with and are not directly exposed to the influence of the water.

The accompanying drawings illustrate a wave motor embodying my said invention.

Figure 1:
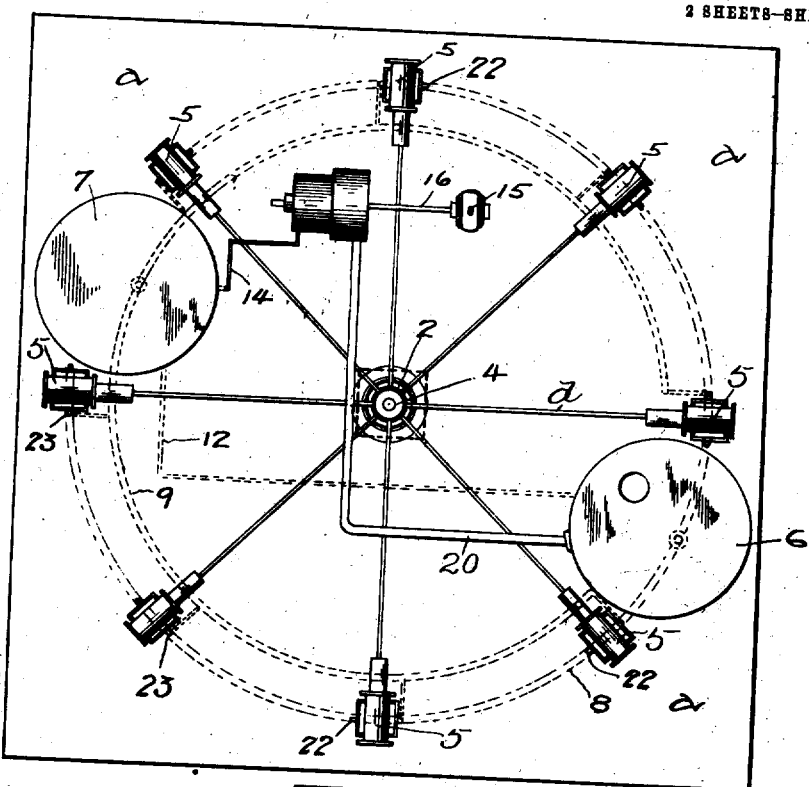
Figure 2:
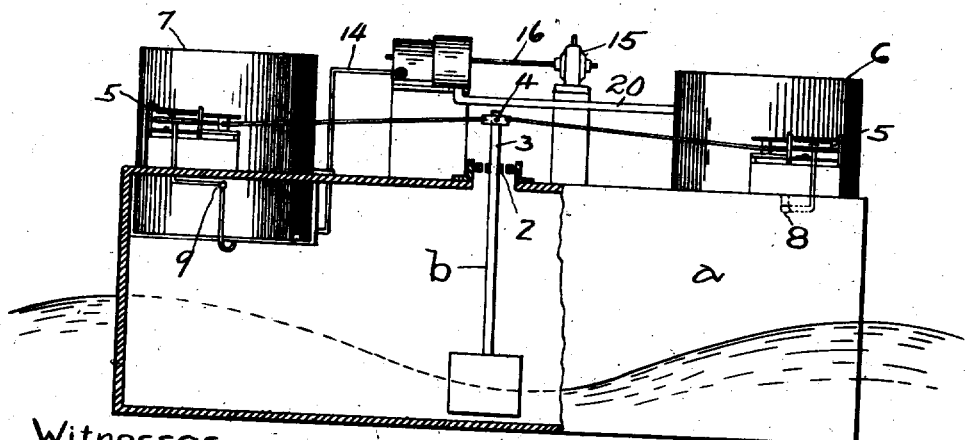
Figure 4:
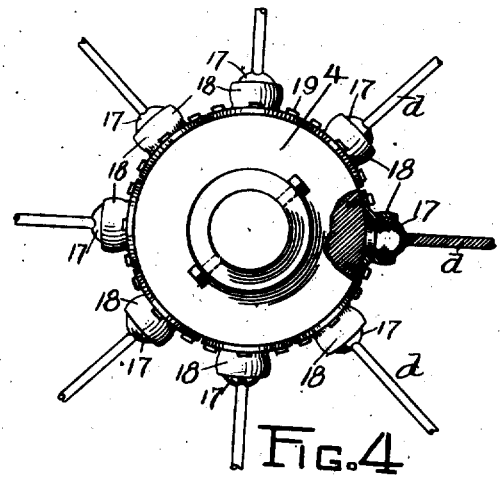
Figure 5:
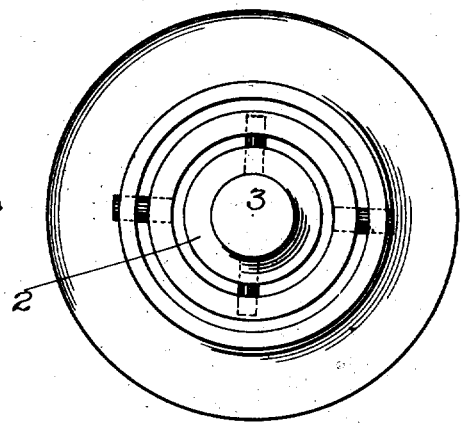
Figure 3:
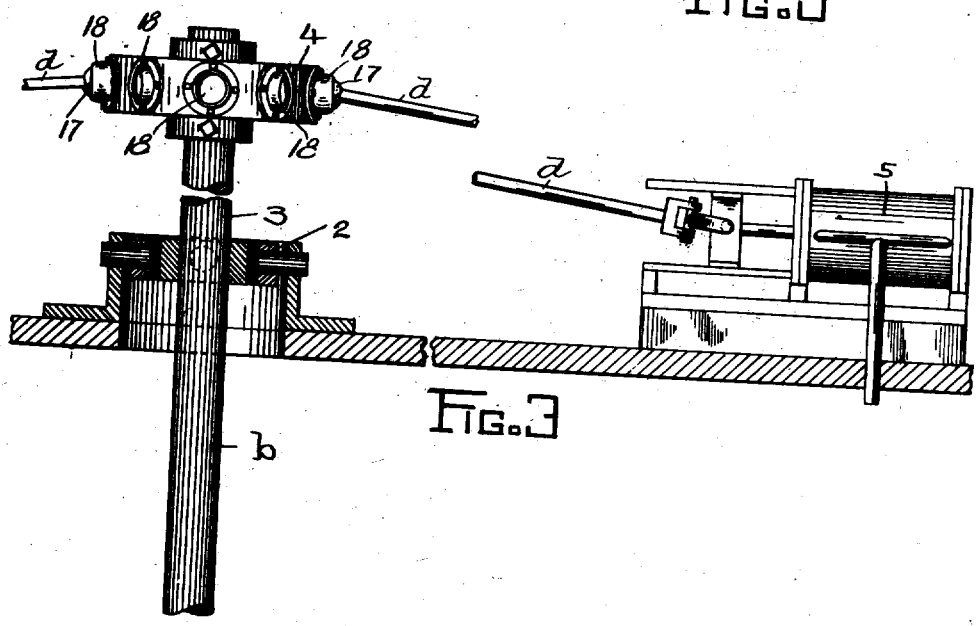

Figure 1 is a plan or top-view of the complete apparatus. Fig. 2 is an elevation partly in section. Fig. 3 is a detail on an enlarged scale of the head and connections on the pendulum, parts being broken away to reduce the size of the figure. Fig. 4 is a plan or top-view of the head on the top of the pendulum, showing the connecting means between the pump-rods and the lever. Fig. 5 is a plan or top-view of the axis or the suspending means for the pendulum.

The principal parts or features in a wave motor of my invention comprise a float *a* in the form of a closed buoyant vessel with a space or compartment below the deck, a freely swinging pendulum, consisting of a weight carrying lever *b* hung or suspended in said space or compartment under the deck from a universal joint or gimbal for oscillating movement in a limited arc in any direction, and means connected with said pendulum operating to convert its movements in whatever direction it may swing, into rotary motion of a shaft.

The pendulum and all the mechanism as well are mounted and carried on the deck of the float *a*, so as to be entirely out of direct contact with the water and not exposed to or directly acted on by the waves.

The float *a* is preferably constructed like a barge, or is provided with a space or compartment below the deck of sufficient dimensions to contain and inclose the pendulum; in which feature a wave motor of my invention differs from other apparatus having a swinging pendulum. Instead of being inclosed, however, as shown in Fig. 2, the pendulum can be mounted for oscillating movement above the deck by raising the point of suspension.

The pendulum is suspended in either arrangement by a gimbal —2— and the shorter arm or member —3— of the pendulum lever extending above the deck carries a head —4— to which are connected at intervals around the circle the piston-rods or plungers of a series of pumps —5— so arranged that in whatever direction the pendulum may be caused to swing under the rolling of the float, one or more of the pumps will operate. In the present construction each pump-rod is connected with the head 4 of the pendulum by a ball and socket joint consisting of a ball 17 on the end of the pump-rod *d* and a spherical socket 18 on the rim of the head, as seen in Figs. 3 and 4; where the socket is composed of a split cup having a flanged base by which the parts or sections are secured to the head after being placed around the ball member 17 on the end of the pump-rod. The sections of the cup-shaped socket are fastened to the rim of the head 4 by lag-screws 19. These pumps are separately connected through a system of pipes both with a tank —6— supplying a non-compressible fluid, such as water or oil, and also with a receiving tank —7— in which the fluid is pumped with the effect to accumulate and maintain pressure by compression of the confined air in the tank. To that end the supply tank is under normal atmospheric pressure, but the receiving tank is closed.

As arranged in the apparatus illustrated in the drawings the suction side or inlet ports 22 of the pumps are all connected with the supply-tank 6 through the pipes 8; and the pressure side or outlet ports 23 of the pumps are connected to the pressure tank 7 through the pipes 9.

It is evident that as the liquid in the receiving-tank increases in volume the pressure will rise in proportion and there will be greater resistance thrown on the pistons, but this acting as a governor has the effect to prevent the pressure from rising too high in the tank, and to secure a more steady and even oscillation of the pendulum.

A relief valve of any well known construction is placed in the connection between the receiving tank 7 and the supply tank 6 so as to relieve the pressure in the former in the event of it becoming excessive. No special form or style of relief valve is required for that purpose; it should be adjustable, however, to hold the working pressure in the receiving tank to the point or degree at which it is desired to afford relief in the tank. It is not considered necessary to the clear understanding of the invention that such a relief valve should be particularly described or shown, as relief valves are already known and used for similar purposes in a variety of apparatus or machines.

As the total volume of the liquid in the supply tank is placed at less than that in the receiving tank, the result is that in the event of all the liquid being drawn off by the pumps and accumulated in the receiving tank there will be air under compression in the receiving tank.

As illustrated in the drawing the energy developed and stored in the receiving tank through the compression of the fluid is utilized and applied to operate a hydraulic motor such as a turbine wheel by carrying a pipe —14— from the pressure tank to the casing of the motor, and connecting the discharge sides of the turbine with the supply tank; the turbine being set sufficiently above the level of the deck to cause the fluid to return by gravity. The suction side or inlet ports of the pumps are similarly located that the fluid may flow to the pumps by gravity or under conditions of the least resistance.

In the present construction of the wave motor of my invention rotary motion is imparted to a shaft from which the power is taken to operate a dynamo electrical machine —15—. This is done by driving a turbine wheel with the energy developed in the fluid pressure tank —7— and connecting the dynamo with the shaft —16— of the turbine wheel, or mounting them on a common shaft. Other modes or means of utilizing and applying the energy stored in the pressure tank to actuate machinery or perform work can obviously be employed.

As thus constructed the wave motor of my invention is controlled and held in position where it will be exposed to the waves or regular swell by means of cables and anchors. The float or barge is preferably constructed to set high in the water; and to rock or roll while riding at anchor.

Among other applications and uses of the invention it will be found well adapted to operate a whistle or other signal; to generate the electricity for a signal light, and thus be employed as a marine buoy or a light boat.

I claim:—

1. A wave motor comprising a hollow float, an oscillating pendulum inclosed by said float out of contact with the water and suspended within the float for universal movement in all directions around a circle having the point of oscillation for its center, and means for transforming into reciprocating movements in varying directions radially from the center the oscillations of the pendulum, comprising a plurality of cylinders having inlet and outlet ports connecting with a body of fluid, pistons in said cylinders, and means connecting said pistons with the pendulum for producing reciprocating movement of the pistons from the oscillations of the pendulum.

2. The combination of a float, a pendulum suspended thereon out of contact with the water, a cylinder, a piston operating in said cylinder, means for operatively connecting the piston with the pendulum, a pressure tank and a supply-tank for a fluid and means connecting the suction side of the cylinder with the supply-tank and its pressure side with the pressure tank.

3. In a wave motor, the combination of a float, a pendulum suspended thereon out of contact with the water, a plurality of cylinders on said float, pistons operating in said cylinders, means operatively connecting the pistons with the pendulum, a supply-tank, means connecting the cylinder with said tank for supplying fluid thereto, a pressure tank, means connecting the said cylinders with the pressure tank, a hydraulic motor and means connecting said motor with the pressure tank.

4. In a wave motor, the combination of a float, a universally swinging pendulum suspended therein for operation out of contact with the water, a plurality of pump-cylinders on the float, each having a piston and a pump-rod connected with the pendulum by a universal joint, situated between the pump-rod and the head of the piston, a supply tank connected with the space in each cylinder on one side of the piston, a pressure tank connected with the space in each cylinder on the opposite side of the piston, and a hydraulic motor arranged with relation to the pressure tank to be operated by the pressure therefrom.

FRANK H. FARMER.

Witnesses:
 EDWARD E. OSBORN,
 M. REGNER.